(12) United States Patent
Dieron et al.

(10) Patent No.: US 7,457,072 B2
(45) Date of Patent: Nov. 25, 2008

(54) DISK DRIVE WITH HEAD FLY-HEIGHT COMPENSATION FOR DISK SURFACE VARIATIONS

(75) Inventors: Roel Dieron, San Jose, CA (US); Ryohheita Hattori, San Jose, CA (US); Satyajit Neelkanth Patwardhan, Fremont, CA (US); Christopher David Wiederholt, Rochester, MN (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 98 days.

(21) Appl. No.: 11/566,678

(22) Filed: Dec. 4, 2006

(65) Prior Publication Data

US 2008/0130159 A1 Jun. 5, 2008

(51) Int. Cl.
*G11B 5/60* (2006.01)
*G11B 21/12* (2006.01)
(52) U.S. Cl. .................................................. 360/75
(58) Field of Classification Search ................ None
See application file for complete search history.

(56) References Cited

U.S. PATENT DOCUMENTS

| | | | |
|---|---|---|---|
| 5,021,906 A | 6/1991 | Chang et al. | |
| 5,130,866 A | 7/1992 | Klaassen et al. | |
| 5,276,573 A | 1/1994 | Harada et al. | |
| 5,991,113 A | 11/1999 | Meyer et al. | |
| 6,344,949 B1 | 2/2002 | Albrecht et al. | |
| 6,501,606 B2 * | 12/2002 | Boutaghou et al. | 360/75 |
| 6,570,730 B1 | 5/2003 | Lewis et al. | |
| 6,611,399 B1 | 8/2003 | Mei et al. | |
| 6,775,103 B2 | 8/2004 | Kang et al. | |
| 6,947,242 B2 | 9/2005 | Seing et al. | |
| 7,023,647 B2 | 4/2006 | Bloodworth et al. | |
| 7,068,449 B2 * | 6/2006 | Riddering et al. | 360/75 |
| 7,224,547 B2 * | 5/2007 | Suk | 360/75 |
| 7,271,975 B2 * | 9/2007 | Shimizu et al. | 360/75 |
| 2005/0024775 A1 | 2/2005 | Kurita et al. | |
| 2005/0264912 A1 | 12/2005 | Nikitin et al. | |
| 2006/0023331 A1 | 2/2006 | Flechsig et al. | |

(Continued)

OTHER PUBLICATIONS

"Head-Disk Spacing Controller for Magnetic Recording." Apr. 1, 1989, IBM TDB vol. 31, No. 11, pp. 240-241.*

*Primary Examiner*—Hoa T Nguyen
*Assistant Examiner*—James L Habermehl
(74) *Attorney, Agent, or Firm*—Thomas R. Berthold (57) ABSTRACT

A disk drive has a head fly-height actuator wherein the head-disk spacing is controlled as a function of both the track, and the sector or sectors within the track, where data is to be read or written. The fly-height actuator may be a thermal actuator comprising a heater located on the slider near the read/write head. The fly-height controller (FHC) for the thermal actuator stores band control signal (BCS) values representative of heater power (Hp) to be applied to the thermal actuator when reading or writing to a data track in the associated band of tracks. The FHC also either calculates from a programmed equation or recalls sector control signal (SCS) values representative of an Hp increment to be applied to the thermal actuator depending on the sector or sectors where data is to be written. The FHC sums the appropriate SCS value with the appropriate BCS value to achieve the desired Hp, resulting in the optimal fly-height not only for the selected band but also for the selected sector or sectors.

3 Claims, 5 Drawing Sheets

U.S. PATENT DOCUMENTS

2006/0092570 A1  5/2006  Payne et al.
2006/0158768 A1  7/2006  Tanabe
2007/0146920 A1* 6/2007  Kitamura et al. .............. 360/75

* cited by examiner

DISK DRIVE WITH HEAD FLY-HEIGHT COMPENSATION FOR DISK SURFACE VARIATIONS

BACKGROUND OF THE INVENTION

1. Field of the Invention

This invention relates to magnetic recording disk drives, and more particularly to disk drives that have a fly-height actuator for controlling the spacing between the read/write head and the disk.

2. Description of the Related Art

Magnetic recording hard disk drives use a read/write transducer or head mounted on a head carrier for reading and/or writing data to the disk. The head carrier is typically an air-bearing slider attached to an actuator arm by a suspension and positioned very close to the disk surface by the suspension. There are typically a stack of disks in the disk drive with a slider-suspension assembly associated with each disk surface in the stack.

The separation or spacing between the head and the disk surface is called the fly-height. The slider has a disk-facing air-bearing surface (ABS) that causes the slider to ride on a cushion or bearing of air generated by rotation of the disk. The slider is attached to a flexure on the suspension and the suspension includes a load beam that applies a load force to the slider to counteract the air-bearing force while permitting the slider to "pitch" and "roll". The flying dynamics of the slider and thus the fly-height are influenced by factors such as the rotation speed of the disk, the aerodynamic shape of the slider's ABS, the load force applied to the slider by the suspension, and the pitch and roll torques applied to the slider by the suspension.

Disk drives have been proposed that use a fly-height actuator for changing the spacing between the head and the disk surface. One type of fly-height actuator is a thermal actuator with an electrically-resistive heater located on the slider near the head. When current is applied to the heater the heater expands and causes the head to "protrude" and thus move closer to the disk surface. Other fly-height actuators for moving the head relative to the slider include electrostatic microactuators and piezoelectric actuators. Another type of fly-height actuator, also based on thermal, electrostatic or piezoelectric techniques, changes the head-disk spacing by altering the air-flow or the shape of the slider's ABS.

Because the fly-height is primarily affected by the radial location of the head on the disk, disk drives with fly-height actuators typically adjust the fly-height depending on the radial location, i.e., the data track, where the head is reading or writing data. This is typically accomplished by determining the optimal head-disk spacing for each of a plurality of radial bands of data tracks during manufacturing, and then storing a set of control signal values in the disk drive. During operation of the disk drive the data track where data is to be read or written is identified, and the appropriate control signal value is recalled and used to control the fly-height actuator to set the head-disk spacing to the optimal value for the band in which the data track is located.

However, the disk surfaces are not perfectly flat but have a "warpage". This warpage or axial variation of the disk surface is a result of several factors, including the need for very thin disk substrates and the distortion caused by the force needed to clamp the disk to the hub or spindle. This disk warpage results in a variation of fly-height with angular position.

What is needed is a disk drive with a fly-height actuator that adjusts the head-disk spacing to the optimal value not just as a function of disk radius, but also as a function of angular position within the data track.

SUMMARY OF THE INVENTION

The invention is a disk drive with a fly-height actuator wherein the head-disk spacing is controlled as a function of both the track and the angular position in the track, i.e. the sector or sectors, where data is to be read or written. The fly-height actuator may be a thermal actuator comprising a heater located on the slider near the read/write head. The fly-height controller (FHC) for the thermal actuator stores band control signal (BCS) values representative of heater power (Hp) to be applied to the thermal actuator when reading or writing to a data track in the associated band of tracks.

In this invention, as part of the disk manufacturing process, the head-disk spacing (d) is measured as a function of sector number for each head and disk surface combination. The measurements can be made at just one radial position, e.g., at a midpoint between the disk inside and outside diameters, or at several locations, e.g., at the middle of each of the bands. In a first embodiment of the invention, the measured "d" samples are fit to a curve to generate an equation, typically a polynomial, of "d" as a function of sector number. Since the change in "d" ($\Delta d$) is directly related to a change in heater power ($\Delta Hp$), an equation of $\Delta Hp$ as a function of sector number can be generated. Thus an equation of fly-height sector control signal (SCS) values as a function of sector number is programmed into the FHC. A single SCS equation can be used for each disk surface or a SCS equation calculated and programmed for each band for each disk surface. During operation of the disk drive, the FHC receives the track number and sector number where the data is to be read or written. The FHC runs the SCS program to calculate the SCS value for the data sector where data is to be read or written. In a second embodiment, the SCS values are calculated during manufacturing and stored in the FHC. There may be a single set of SCS values to be used for all bands, or a different set for each band. During operation, the FHC receives the track number and sector number where the data is to be read or written, identifies the appropriate band to identify the set of SCS values if there are more than one set, and recalls the SCS value corresponding to the sector closest to the selected data sector. In either embodiment, the FHC also identifies the appropriate band in which the selected data track is located, determines whether the command is to read or write, and recalls the appropriate BCS value. The calculated SCS value or the recalled SCS value is then summed with the BCS value, which either increases or decreases the BCS value. This modified fly-height control signal is sent to the thermal actuator to achieve the desired Hp, resulting in the optimal fly-height not only for the selected band but also for the selected sector or sectors.

For a fuller understanding of the nature and advantages of the invention, reference should be made to the following detailed description taken together with the accompanying figures.

DETAILED DESCRIPTION OF THE INVENTION

Figure 1:
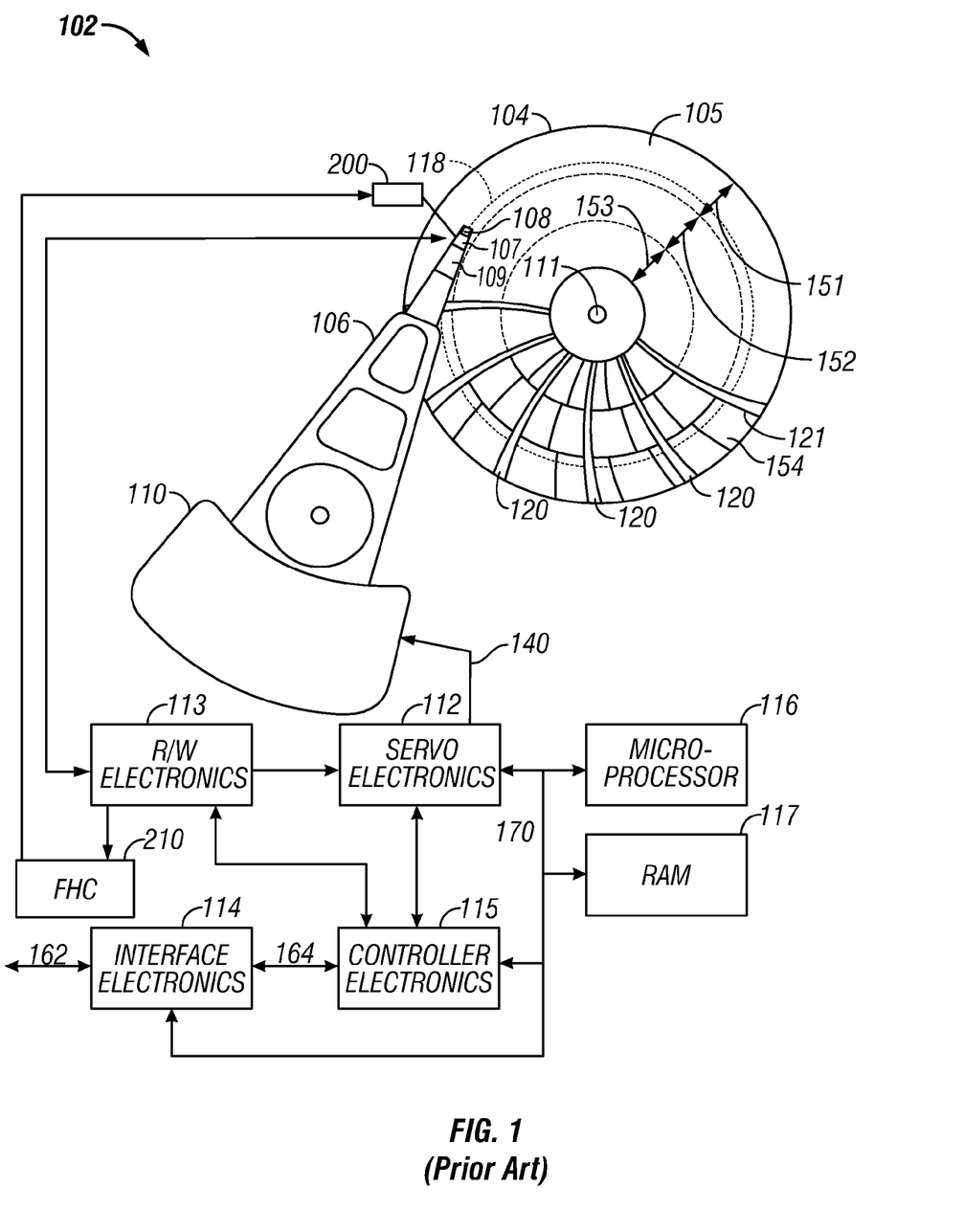
FIG. 1 is a schematic block diagram of a conventional magnetic recording disk drive with a fly-height actuator.

FIG. 1 is a block diagram of a conventional disk drive of the type usable with the present invention. The disk drive depicted is one that is formatted using a fixed-block "headerless" architecture with sector servo and zone-bit recording (ZBR), but the invention is applicable to disk drives using other types of data architectures and servo systems.

The disk drive, designated generally as 102, includes at least one data recording disk 104, a voice coil motor 110 actuator, an actuator arm 106, a suspension 109, a head carrier or slider 107, a data recording transducer 108 (also called a recording head or read/write head), servo electronics 112, read/write electronics 113, interface electronics 114, controller electronics 115, microprocessor 116, and RAM 117. The recording head 108 may be an inductive read/write head or a combination of an inductive write head with a magnetoresistive (MR) read head. The read/write 108 is typically located on a head carrier, such as an air-bearing slider 107 that has an air-bearing surface (ABS) facing the surface 105 of disk 104. The slider 107 is attached to the actuator arm 106 by a suspension 109 that allows the slider to "pitch" and "roll" with its ABS supported above but in close proximity to the surface 105 of rotating disk 104.

While only one head 108 and associated disk surface 105 are shown in FIG. 1, there are typically multiple disks stacked on a hub that is rotated by a disk motor, with a separate read/write head associated with each surface of each disk. Data recording disk 104 has a center of rotation 111, and is divided for head positioning purposes into a set of radially-spaced tracks, one of which is shown as track 118. The tracks are grouped radially into a number of zones or bands, three of which are shown as bands 151, 152 and 153. The 104 disk contains a plurality of servo sectors 120, which extend across the tracks in a generally radial direction. Each track has a reference index 121 indicating the start of track. Within each band, the tracks are also circumferentially divided into a number of data sectors 154 where user data is stored. In a "headerless" or "No-ID" data architecture, the data sectors contain no data sector identification (ID) fields for uniquely identifying the data sectors. If the disk drive has multiple heads, one head for each disk surface, as is typical, then the set of data tracks that are at the same radius on all disk data surfaces is referred to as a "cylinder".

Read/write electronics 113 receives signals from head 108, passes servo information from the servo sectors 120 to servo electronics 112, and passes data signals to controller electronics 115. Servo electronics 112 uses the servo information to produce a current at 140 which drives voice coil motor 110 to position the head 108 to the desired data track and to maintain it on the data track during reading and writing. Interface electronics 114 communicates with a host computer or system (not shown) over interface 162, passing data to the host. Interface electronics 114 also communicates with controller electronics 115 over interface 164, passing read and write commands to the controller electronics 115. Microprocessor 116 has associated memory, such as RAM 117, and communicates with the various other disk drive electronics over interface 170.

In the operation of disk drive 102, interface electronics 114 receives a request from the host for reading data from or writing data to a selected data sector or sectors 154. Controller electronics 115 receives a list of requested data sectors from interface electronics 114 and converts them into band, cylinder, head, and data sector numbers which uniquely identify the location of the desired data sectors. The head and cylinder information are passed to servo electronics 112, which is responsible for positioning the read/write head 108 over the appropriate data sector on the appropriate cylinder. If the cylinder number provided to servo electronics 112 is not the same as the cylinder number over which the head 108 is presently positioned, servo electronics 112 first executes a seek operation to reposition the head 108 to the appropriate cylinder.

Once servo electronics 112 has positioned head 108 over the appropriate cylinder, servo electronics 112 begins executing sector computations to locate and identify the desired data sector. As servo sectors 120 pass under head 108, the headerless architecture approach is used to identify each servo sector. In brief, a servo timing mark (STM) is used to locate servo sectors, and a count of STMs from a servo sector containing an index mark 121 uniquely identifies each servo sector. Additional information is maintained in association with servo electronics 112 and controller electronics 115 for controlling the reading or writing of data in the data sectors.

Figure 2A:
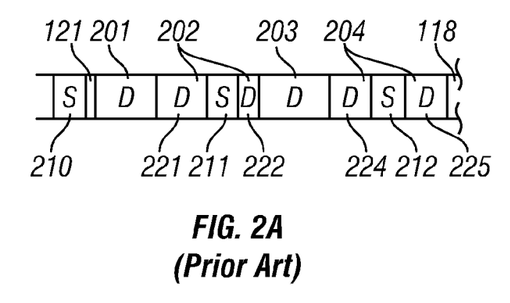
FIG. 2 is a portion of a typical data track showing four complete data sectors and three representative servo sectors.
Figure 2B:
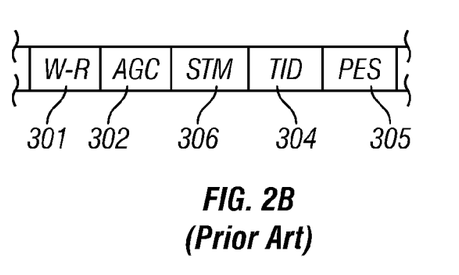
FIG. 2B is an expanded view of one of the servo sectors illustrated in FIG. 2A.

Referring now to FIG. 2A, a portion of a typical track 118 on the disk 104 is shown expanded. Four complete data sectors are shown (201, 202, 203 and 204). Three representative servo sectors 210, 211, and 212 are also shown. As can be seen from this example, some data sectors are split by servo sectors, and some data sectors do not start immediately following a servo sector. For example, data sectors 202 and 204 are split by servo sectors 211 and 212, respectively. Data sector 202 is split into data sections 221 and 222, and data sector 204 is split into data sections 224 and 225. Data sector 203 starts immediately after the end of data sector 202, rather than immediately following a servo sector. The index mark 121 indicates the beginning of the track and is shown contained in servo sector 210. FIG. 2B is an expanded view of one of the servo sectors illustrated in FIG. 2A. Typically, each servo sector contains an STM 306. The STM 306 serves as a timing reference for reading the subsequent servo information in track identification (TID) field 304 and position error signal (PES) field 305. The STM is sometimes also referred to as a servo address mark or servo start mark. The TID field 304 typically includes a servo sector number (SSN) for uniquely identifying the servo sector.

The disk drive shown in FIG. 1 also includes a fly-height actuator 200 for changing the spacing between read/write head 108 and the surface of disk 104. Fly-height actuator 200 is controlled by a fly-height controller (FHC) 210. In the preferred embodiment the fly-height actuator 200 is a thermal actuator located on slider 107.

Figure 3:
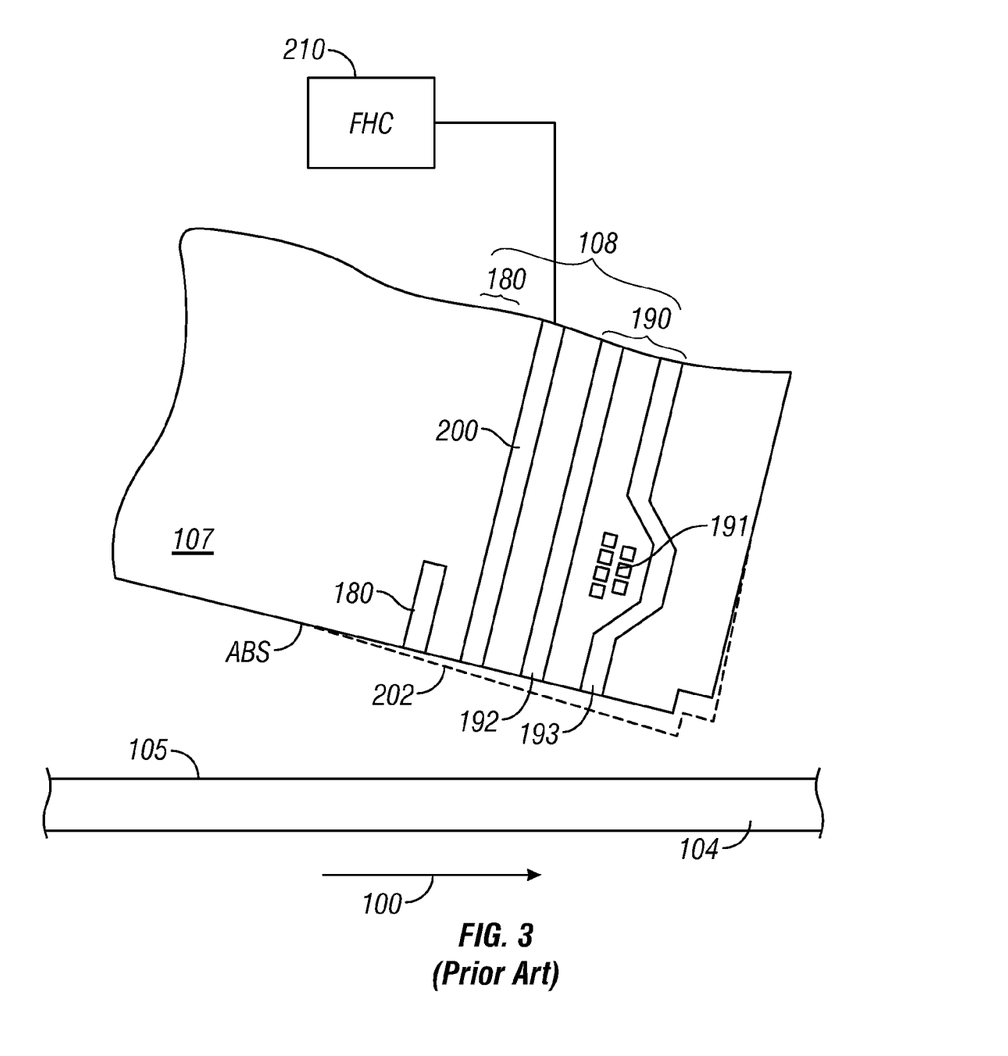
FIG. 3 is a sectional view of the end portion of an air-bearing slider above the surface of a disk and illustrates a thermal fly-height actuator, a read head and a write head on the slider.

FIG. 3 is a sectional view of the end portion of slider 107 above the surface 105 of disk 104 and shows the read/write head 108 and thermal fly-height actuator 200. The rotation of the disk 104 in the direction of arrow 100 generates an air bearing between the ABS of slider 107 and disk surface 105. During operation of the disk drive, the air bearing counterbalances the slight spring force of the suspension 109 (FIG. 1)

and supports the slider 107 off and slightly away from the disk surface 105 by a small, substantially constant spacing. The read/write head 108 includes a MR read head 180 and write head 190. Write head 190 is an inductive write head with coil 191 located between the two write poles 192, 193. The write head 190 is depicted as a write head with two write poles for horizontal recording, but the write head may also be a perpendicular magnetic recording write head with a single write pole and one or more return poles.

The thermal fly-height actuator in FIG. 3 is an electrically-resistive heating element or heater 200 electrically connected to and controlled by FHC 210. FHC 210 is a power source that controls the amount of current to the heater 200, such as by controlling the settings of a variable resistor. As the current increases, the heater 200 expands and causes protrusion (PTR) of the head 108, as shown by the dashed line 202, which moves the MR read head 180 and pole tips 191, 192 of write head 190 closer to disk surface 105. The FHC 210 may include a temperature feedback control circuit that monitors the temperature of the heater 200 to maintain the fly-height of the head 108 within a desired range during operation of the disk drive.

A thermal fly-height actuator is described in U.S. Pat. No. 5,991,113 and published patent application US 2005/0024775 A1. U.S. Pat. No. 7,023,647 B2 describes a thermal actuator fly-height control circuit that may be implemented into the disk drive's MR head pre-amplifier circuit. Other fly-height actuators for moving the head relative to the slider include electrostatic microactuators, such as described in U.S. Pat. No. 6,611,399 B1, and piezoelectric actuators, such as described in U.S. Pat. No. 6,570,730 B1. Another type of fly-height actuator changes the head-disk spacing by altering the air-flow or the shape of the slider's ABS. This type of fly-height actuator includes thermal actuators, such as described in U.S. Pat. No. 6,775,103 B2, electrostatic actuators, such as described in U.S. Pat. Nos. 5,276,573 and 6,344,949, and piezoelectric actuators, such as described in U.S. Pat. No. 5,021,906.

Figure 4:
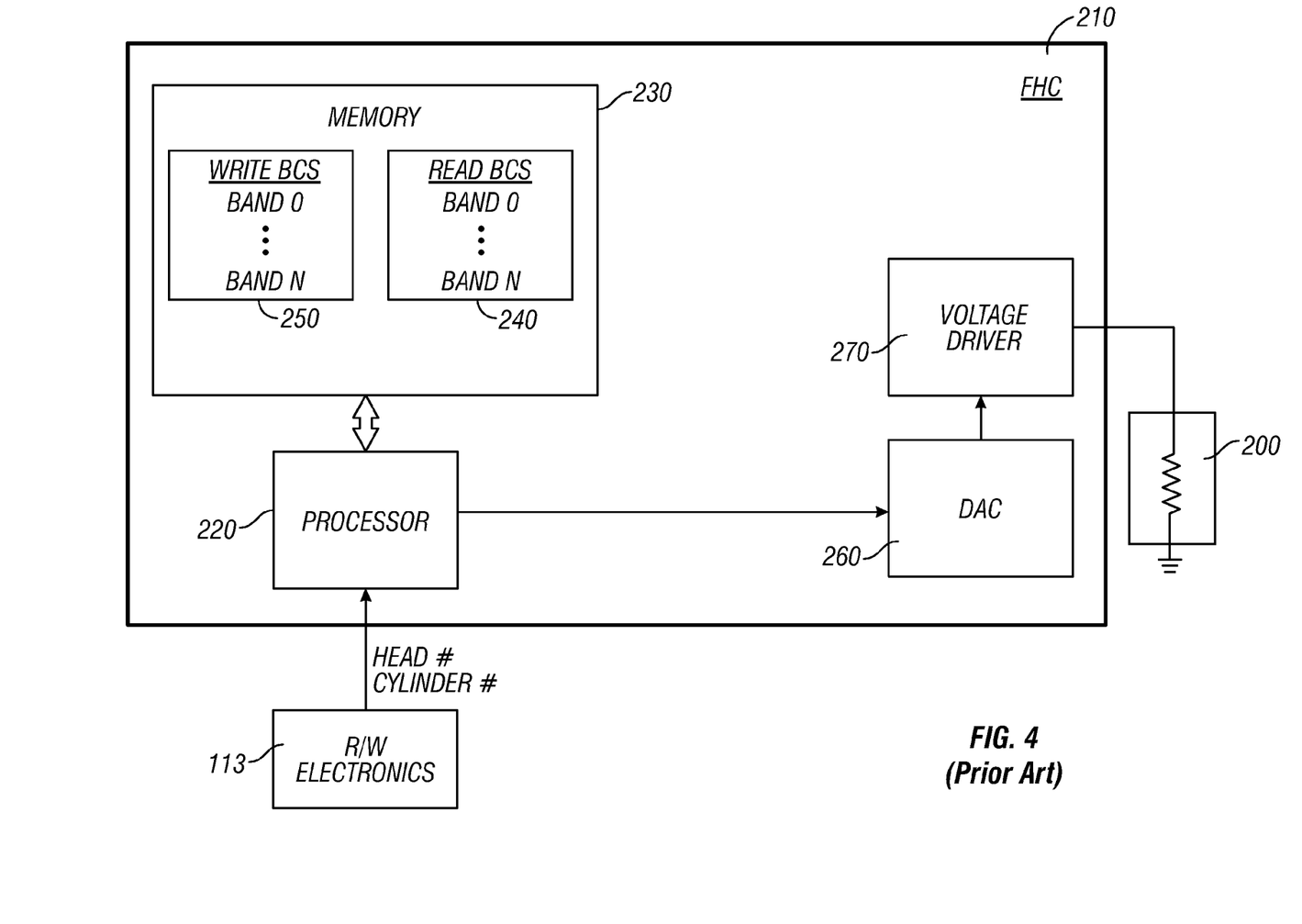
FIG. 4 is a high-level schematic of the fly-height controller shown in FIG. 1.

FIG. 4 is a high-level schematic of the FHC 200. FHC 200 includes a processor 220, associated memory 230 addressable by processor 220, a digital-to-analog converter (DAC) 260, and a voltage driver 270. The memory 230 includes a read fly-height control signal register 240 and a write fly-height control signal register 250. Register 240 stores a set of fly-height read control signal values for the bands of data tracks on disk 104. Each control signal value for a band is called a band control signal (BCS), so register 240 stores a set of read BCS values to be used during reading. Similarly, register 250 stores a set of fly-height write BCS values to be used during writing. During operation of the disk drive 102 (FIG. 1), the controller electronics 115 (FIG. 1) sends read and write commands to read/write electronics 113 to read or write data to a selected data track and sector or sectors. This information, specifically the head number and cylinder number where data is to be read or written, is passed from read/write electronics 113 to processor 220 of FHC 210. Processor 220 identifies the appropriate band in which the selected data track is located, determines whether the command is to read or write, and recalls from memory 230 the appropriate read BCS value or write BCS value. This value is then passed to DAC 260 which controls voltage driver 270. Voltage driver 270 applies the current level corresponding to the selected BCS value to resistive heater 200 to achieve the desired heater power (Hp). This causes protrusion of the read/write head 108 (FIG. 3) to achieve the optimal head-disk spacing for reading or writing to the selected data track. The need for different BCS values for reading (register 240) and writing (register 250) is due to the fly-height difference caused by "write protrusion", which only happens during a write operation when heat from the write coil 191 (FIG. 3) causes some protrusion of the because the write pole tips 192, 193.

The BCS values in registers 240, 250 are stored as part of the disk drive manufacturing process. The relationship between head-disk spacing (d) and heater power (Hp) is determined for each head and disk surface combination, and is given generally by the following:

$$d=(\rho)[Hp(HDC)-Hp(d)] \qquad \text{Equation (1)}$$

where ($\rho$) is the sensitivity of head-disk spacing to heater power (Hp) expressed as follows:

$$\rho=\Delta d/\Delta Hp \qquad \text{Equation (2)}$$

and Hp(HDC) is the value of Hp that results in head-disk contact.

As part of the manufacturing process, each head in the disk drive is moved to each of the bands, and at each band measurements are made to determine overwrite (OW) and soft-error rate (SER) at various head-disk spacings. The OW and SER are well-known measurable parameters and are used to determine the optimal head-disk spacing d. For each of the determined values of d, the values of Hp are calculated and used to determine the BCS values that are then stored in registers 240, 250.

The above-described disk drive with fly-height control is based on the assumption that variations in fly-height occur only with disk radius, and thus each fly-height control signal value is fixed for a data track or band of tracks. However, the disk surfaces are not perfectly flat but have a "warpage". This warpage or axial variation of the disk surface is a result of several factors, including the need for very thin disk substrates and the distortion caused by the force needed to clamp the disk to the hub or spindle. This disk warpage results in a variation of fly-height with angular position. Thus in this invention the fly-height is varied not just with selected data track or band, but with selected angular position within the data track, specifically as a function of data sector or servo sector.

Figure 5:
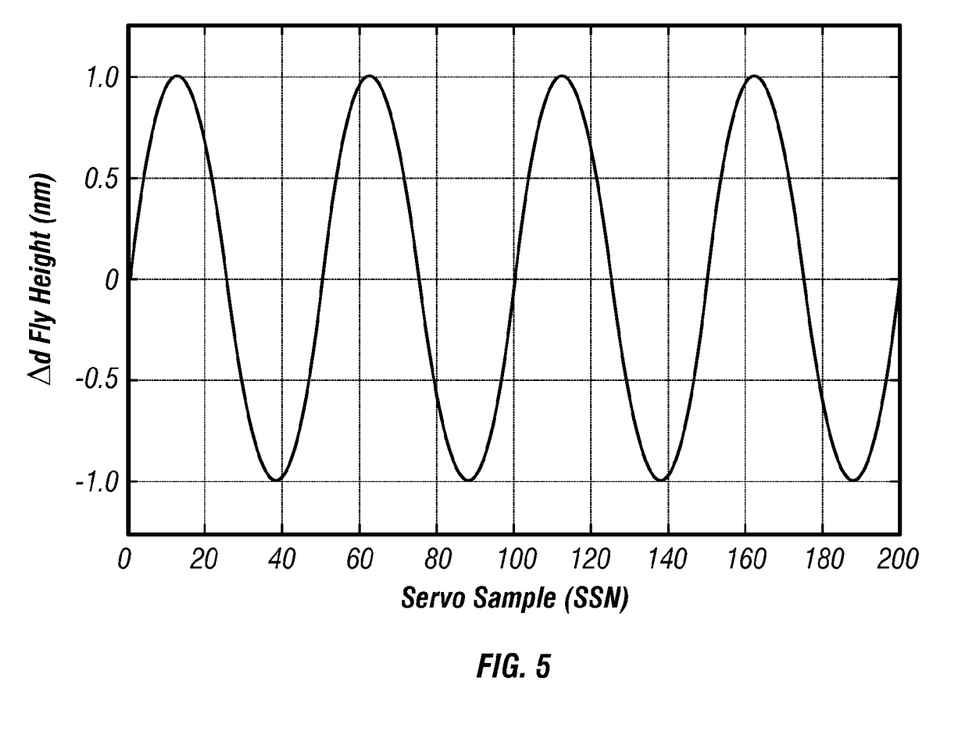
FIG. 5 is a graph of a typical fly-height variation as a function of servo sample, which is due to the axial variation of the disk surface as a function of angular position.

FIG. 5 is a graph of a typical fly-height variation as a function of servo sample, which is due to the axial variation of the disk surface as a function of angular position. In FIG. 5, the vertical axis is the change in head-disk spacing ($\Delta d$) as a function of servo sector number (SSN), with SSN=0 representing track index. Since SSN can be correlated with one or more nearby data sector numbers (see FIG. 2A), $\Delta d$ may also be represented as a function of data sector. In FIG. 5, $\Delta d=0$ means that d is at its optimal value, a positive $\Delta d$ means there is a "dip" in the disk surface causing an increase in d, and a negative $\Delta d$ means there is a "rise" in the disk surface causing a decrease in d. FIG. 5 is an idealized representation showing equal-amplitude dips and rises and a precise period of the dips and rises; in actuality each disk surface will have different amplitudes at different angular positions and different periods between the dips and rises.

In this invention, as part of the disk manufacturing process, for each head and disk surface combination the head-disk spacing is measured as a function of angular position, using any one of several known techniques. The measurements can be made at just one radial position, e.g., at a midpoint between the disk inside and outside diameters, or at several locations, e.g., at the middle of each of the bands.

One technique for accumulating data like that represented by FIG. 5 relies on the variation in the readback signal as a function of magnetic spacing from a previously written reference pattern. Various techniques are available and are generally based on the well-known Wallace spacing loss relationship:

$$d_0 - d(t) = (B/\pi)\ln[A(t)/A_0] + (B/\pi)\ln[C(t)/C_0],\quad\text{Equation (3)}$$

where a single-frequency reference pattern with wavelength λ and length of bit cell B=λ/2 is written on the disk and $A_0$ is the amplitude of the readback signal for the reference pattern at the reference magnetic spacing $d_0$, and d(t) is the magnetic spacing for a read head that detects an amplitude A(t) of the single-frequency reference pattern. C is a constant that depends on reader sensitivity and temperature. C(t) and $C_0$ are two values of C which correspond to d(t) and $d_0$, respectively.

Other techniques for determining head-disk spacing from the readback signal include the pulse-width method and the harmonic ratio fly-height (HRF) method. The pulse-width method relies on changes in pulse width at 50% amplitude (PW50) with changes in magnetic spacing. The HRF method calculates the ratio of the fundamental amplitude to the third harmonic amplitude of the readback signal, and is described in detail in U.S. Pat. No. 5,130,866.

Figure 6:
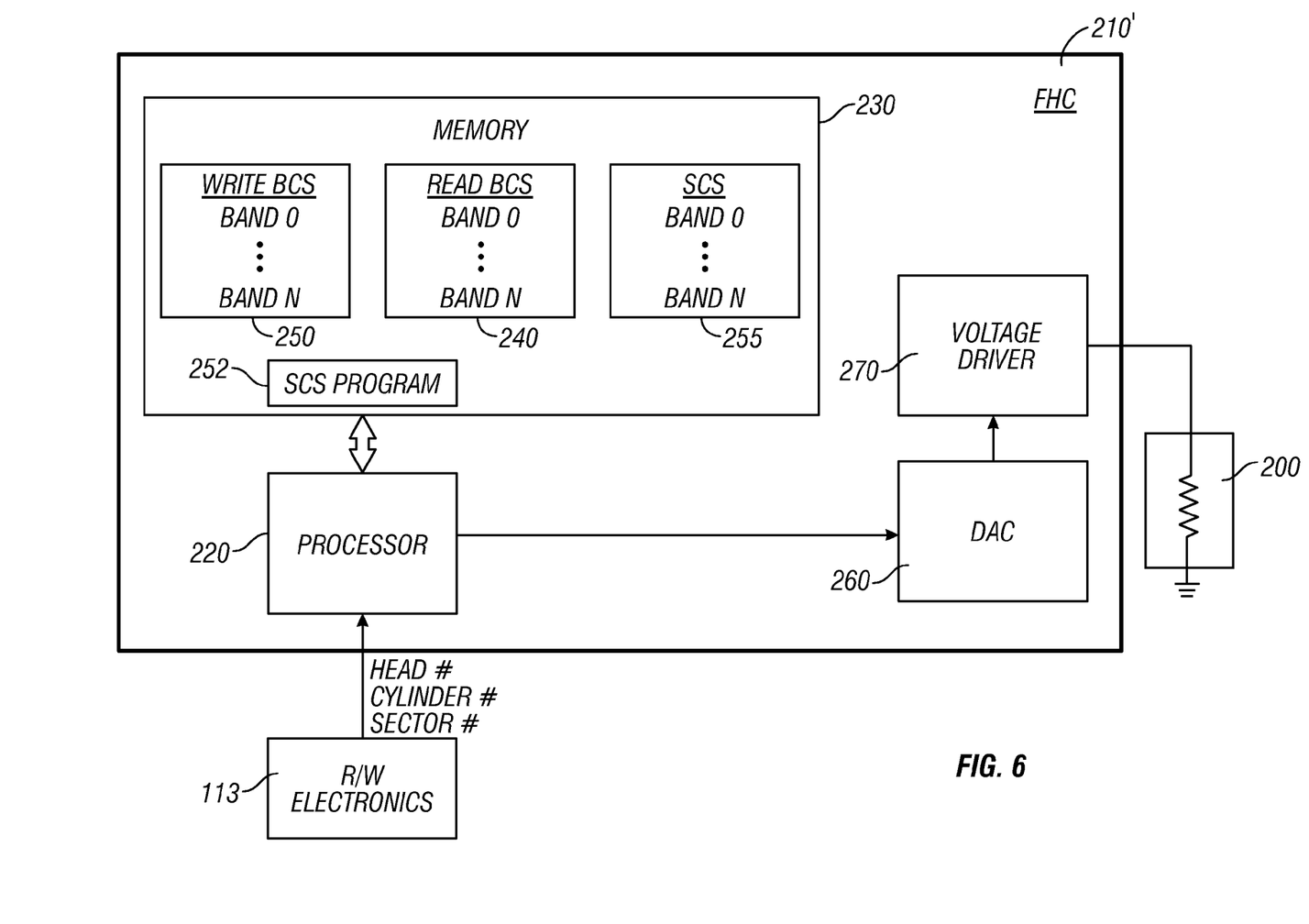
FIG. 6 is a high-level schematic of a fly-height controller for use with this invention.

FIG. 6 is a high-level schematic of a modified FHC 210' for use with this invention. In a first embodiment of the invention, the measured Δd samples are fit to a curve to generate an equation, typically a polynomial, of Δd as a function of SSN. Since Δd is directly related to ΔHp from Equation (2) above, an equation of ΔHp as a function of SSN can be generated. The fly-height control signal value required to generate ΔHp at fly-height actuator 200 is known. Thus an equation of fly-height sector control signal (SCS) values as a function of SSN is programmed into memory 230 of FHC 210', as depicted by SCS Program 252. A single SCS equation can be used for each disk surface or a SCS equation calculated and programmed for each band for each disk surface. During operation of the disk drive, the controller electronics 115 sends read and write commands to read/write electronics 113 to read or write data to a selected data track and sector or sectors. This information, specifically the head number, cylinder number, and sector number where data is to be read or written, is passed from read/write electronics 113 to processor 220 of FHC 210'. The data sector number can be directly correlated to SSN. Processor 220 then runs the stored program to calculate the SCS value for the data sector where data is to be read or written. The processor 220 also identifies the appropriate band in which the selected data track is located, determines whether the command is to read or write, and recalls from memory 230 the appropriate BCS value. The calculated SCS value is then summed with the BCS value, which either increases or decreases the BCS value. This modified fly-height control signal is sent to DAC 260 which controls voltage driver 270. Voltage driver 270 applies the current level corresponding to the modified BCS value to resistive heater 200 to achieve the desired heater power (Hp), resulting in the optimal fly-height not only for the selected band but also for the selected data sector or sectors.

In a second embodiment of the invention, the SCS values are calculated during manufacturing and stored in memory. This is illustrated in FIG. 6 with register 255 in memory 230 that contains a set of SCS values. There may be a single set of values to be used for all bands, or a different set for each band. The number of SCS values in each set may be selected during manufacturing and may be more or less than the number of servo sectors on the disk surface. During operation, the processor 220 receives the head, cylinder and sector number, identifies the appropriate band to identify the set of SCS values if there are more than one set, and recalls from register 255 the SCS value corresponding to the sector closest to the selected data sector. The processor 220 also determines whether the command is to read or write, and recalls from either register 240 or register 250 the appropriate BCS value. The recalled SCS value is then summed with the recalled BCS value, which either increases or decreases the BCS value. This modified fly-height control signal is sent to DAC 260 which controls voltage driver 270 to apply the appropriate level of heater power, in the manner previously described.

While the invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A magnetic recording disk drive comprising:
  a magnetic recording disk having a plurality of generally concentric data tracks arranged in a plurality of radially-spaced bands, each of the data tracks having a plurality of angularly spaced data sectors and a plurality of angularly spaced servo sectors containing servo information;
  an air-bearing slider maintained near the surface of the disk when the disk is rotating;
  a read/write head on the slider for reading and writing data in the data sectors and reading servo information in the servo sectors;
  a data controller coupled to the head for selecting a data track and data sector where data is to be read or written;
  a head-positioning actuator for moving the slider and attached head to a selected data track in response to servo information read by the head;
  a thermal fly-height actuator comprising a heater located on the slider near the head for moving the head relative to the slider to change the head-disk spacing; and
  a fly-height controller coupled to the data controller and the fly-height actuator for sending a control signal representing a value of heater power to the fly-height actuator to change the head-disk spacing in response to the selected data track and data sector, the head-disk spacing being a function of heater power;
  memory coupled to the fly-height controller for storing a set of band control signal (BCS) values, each of said BCS values being associated with a unique one of said bands and representing an optimal head-disk spacing for said associated band, and a plurality of sector control signal (SCS) values, each of said SCS values being associated with a unique angular position of the disk and representing an optimal head-disk spacing for said associated angular position, the number of stored SCS values being less than the number of angularly spaced servo sectors; and
  a program of instructions stored in said memory and readable by the fly-height controller for undertaking the method acts of:
    receiving from the data controller a selected data track and data sector where data is to be read or written;
    selecting the BCS value associated with the band containing the selected data track;
    selecting the SCS value associated with the disk angular position nearest the selected data sector;
    summing the selected BCS value with the selected SCS value to generate a fly-height control signal; and applying the fly-height control signal to the fly-height actuator to change the head-disk spacing at the selected data sector prior to reading or writing to the selected data sector.

2. The disk drive of claim 1 wherein each BCS value is a pair of values comprising a read BCS value and a write BCS value and wherein the fly-height controller sums the read BCS value with the SCS value to change the head-disk spacing in response to a read command from the data controller and sums the write BCS value with the SCS value to change the head-disk spacing in response to a write command from the data controller.

3. The disk drive of claim 1 wherein the plurality of SCS values comprises a plurality of sets of SCS values, the number of sets of SCS values being equal to the number of sets of BCS values and each set of SCS values being associated with a unique one of said bands.

\* \* \* \* \*